3,772,384
CARBONYLATION OF ALIPHATIC ORGANIC
HALIDES WITH METALLIC ALCOHOLATES
Richard N. Knowles, Hockessin, Del., assignor to E. I.
du Pont de Nemours and Company, Wilmington, Del.
No Drawing. Continuation-in-part of application Ser. No.
788,944, Jan. 3, 1969, now Patent No. 3,636,082. This
application Aug. 25, 1971, Ser. No. 174,996
Int. Cl. C07c 69/02, 69/52, 69/76
U.S. Cl. 260—476 R                    8 Claims

ABSTRACT OF THE DISCLOSURE

Organic esters are prepared by reacting an organic halide, an alkali or alkaline earth alcoholate and carbon monoxide at elevated temperature and pressure, in the presence of a palladium catalyst and carbon dioxide.

CROSS REFERENCE TO RELATED APPLICATION

This application is a continuation-in-part of my co-pending application Ser. No. 788,944, filed January 3, 1969, now Pat. No. 3,636,082.

BACKGROUND OF THE INVENTION

This invention relates to an improved process for carbonylation of organic halides. The catalytic reactions of organic halides with carbon monoxide are well known. See for example, Tabet, U.S. Pat. 2,565,464, Leibu, U.S. Pat. 2,640,071, Kroeper et al., U.S. Pat. 2,914,554 and Mador et al., U.S. Pat. 3,452,090. However, the improved yield derived from adding carbon dioxide to a reaction mixture of an organic halide, an alkali alcoholate, carbon monoxide and a palladium catalyst has not been appreciated heretofore.

SUMMARY OF THE INVENTION

Organic esters are prepared by reacting at a temperature of 100 to 400° C. and a pressure of 100 to 5,000 p.s.i. (1) carbon monoxide, (2) an organic halide selected from aralkyl halide, aralkenyl halide, alkyl halide, alkenyl halide, alkynyl halide, cycloalkenyl halides or cycloalkyl halide, where the halide is iodine, bromine or chlorine, and (3) an alkali or alkaline earth alcoholate of 1 to 6 carbon atoms, said reaction takes place in the presence of (a) at least one equivalent of carbon dioxide per equivalent of alcoholate, (b) between 0.01 to 50 mole percent of palladium based on the organic halide. When the organic halide is an alkyl halide, it is to be understood that normal-alkyl halides are iodides.

The process of this invention generally gives good yields of organic esters which exhibit excellent purity.

DESCRIPTION OF THE PREFERRED EMBODIMENTS

The organic halide can be an aralkyl halide, alkyl halide, alkenyl halide, alkynyl halide, aralkenyl halide, cycloalkenyl halide, or a cycloalkyl halide which can be substituted with additional organic radicals such as nitrile or acetyl groups which are inert during the process.

The halides which can be used are iodine, bromine and chlorine. The decreasing order of reactivity of the halides is iodine, bromine and chlorine. When a normal alkyl halide is used in this process, the halide must be iodine. In all other organic halides except the alkyl halides, it is preferred to use bromine or chlorine.

The organic halides can contain more than one halide substituent and can even contain several different halides such as combinations of chlorine and bromine. When such combinations are used, the temperature and quantities of reactants can be controlled to take advantage of the relative reactivities of the halides to form an ester from the most reactive halide, or the conditions can be varied to react all of the halide substituents.

Similarly, more than one halide substituent can be attached to the organic molecule, and the relative position of a particular halide to another halide on the organic molecule can cause it to be more reactive in the process of this invention. The reactivity of any organic halide can easily be determined empirically.

Typical organic halides suitable for the process of this invention are methyl chloroacetate, 3-bromopropyne, α-bromotoluene, allyl bromide, chloroacetonitrile, t-butylbromide, 3-bromocyclohexene, 2-iodopropane, 1-chloroacetone, 1-bromoacetone, 3-bromo-2-butaone and 3-chloro-2-pentanone.

The alcoholate used for the carbonylation is an alkali or alkaline earth alcoholate where the organic portion can be a hydrocarbyl group of $C_1$ to $C_6$.

The reaction requires carbon monoxide and in addition, at least one equivalent of carbon dioxide per equivalent of the alcoholate in order to prevent ether byproducts in the reaction. Both of these gases, however, may be present in up to 10-fold excess. The upper limit as a practical matter is based upon the cost of excess materials.

Elemental palladium, palladium salts such as $PdCl_2$ and $Pd(NO_3)_2$ or palladium oxides can be used to catalyze the reaction, but the use of these finely-divided materials is less convenient than is the use of a supported palladium catalyst because of separation problems. The preferred catalyst is elemental palladium or carbon. Other supports which are useful include $\gamma$-$Al_2O_3$, $\eta$-$Al_2O_3$, $\kappa$-$Al_2O_3$, $\chi$-$Al_2O_3$, silica, titania, zirconia, kieselguhr, mixed rare earth oxides or carbonates, barium carbonate, barium sulfate, calcium carbonate, pumice, silica-alumina mixtures, and a variety of molecular sieves. A typical supported catalyst contains 5% elemental palladium by weight. These palladium catalysts not only give excellent results, but are less toxic than other metal carbonyl-type catalysts. Between 0.01–50 mole percent of palladium based on the organic halide starting material is used to catalyze the reaction; 0.1–5 mole percent is preferred. The supported palladium catalysts are better suited for use in continuous reactors than other metal carbonyl catalysts because they are solid and can be mounted in fixed beds.

This reaction may be carried out batchwise in a bomb reactor. The alcoholate and organic halide are placed in the reactor. The desired amount of $CO_2$ is added on a weight basis to the bomb after it has been cooled. The bomb is then charged at room temperature with carbon monoxide. For a 400 cc. reactor, 7–10 atmospheres of carbon monoxide (103–147 p.s.i.) is added. The amount of carbon monoxide added will depend on the reactor size, the amount of organic halide present, and the desired pressure at the operating temperature. The reactor is heated such that the total pressure at elevated temperatures is in the 100–5000 p.s.i. range; 200–1000 p.s.i. is preferred. Higher pressures can be used but they are not needed for this process. This reaction does not require as high a pressure in order to obtain satisfactory yields as compared to conventional carbonylation procedures.

The reaction time and temperature depend on the organic halide starting material. For example the reaction can be run from 15 minutes to more than 5 hours at temperatures between 100° C. to 400° C.

This reaction is operable in the absence of solvent; however, it is preferred that a solvent with no active hydrogen atoms be present for both batch and continuous operation. Suitable solvents include xylene, acetonitrile, decalin, diisopropylbenzene, and toluene. At the temperatures of the reaction, these solvents will contribute considerably to the total pressure. Although small amounts of moisture can be tolerated, the reaction should be carried out under anhydrous conditions for best results.

After the carbonylation reaction is complete, the reaction mixture is cooled and the product, catalyst, and alkali or alkaline earth halide by-product are slurried in the boiling solvent. The heated slurry is filtered to remove the catalyst and the inorganic halide by-product. The method of isolation (crystallization, distillation, etc.) of the ester product will depend on its physical properties.

The inorganic halide by-product can be removed from the catalyst by washing with water and the halogen recovered by conventional methods if desired. For continuous operation, the gases over the product consist of $CO_2$ and excess CO and may be recycled directly to the reactor.

The esters produced by this process are well known and are widely used as chemical intermediates, solvents, etc. Certain esters prepared by the process of this invention are useful as polymer intermediates and others can be used as herbicides.

Example 1

A 400 cc. stainless steel bomb was charged with 9.7 g. of allyl bromide, 4.4 g. of sodium methoxide, 5 g. of 5% palladium on carbon, and 50 ml. of toluene. After the bomb was purged with nitrogen, 5.3 g. of carbon dioxide was added, and the bomb was pressurized to 163 p.s.i.g. with carbon monoxide. The bomb was sealed, and placed in a rack where it was both heated and shaken. The agitating mixture was heated for 2 hours at 100° C. under autogenous pressure (255 p.s.i.g.). The bomb was cooled, and the slurry filtered. The filtrate was distilled through a 40 cm. spinning band column, and the fraction boiling at 96–101° C. was collected. Infra-red and mass spectral data showed that both methyl 3-butenate and methyl 2-butenate were present along with some allyl bromide and toluene.

Example 2

A carbonylation reaction is run according to the procedure of Example 1, substituting 13.4 g. of allyl iodide for the allyl bromide. The reaction is run for 1 hour at 100° C., and the esters are isolated according to the procedures of Example 1.

Example 3

A carbonylation reaction is run according to the procedure of Example 1, substituting 10.8 g. of 1-bromo-2-butene for the allyl bromide. The reaction is run for 2 hours at 100° C., and the methyl 3-pentenoate and methyl 2-pentenoate are isolated by distillation of the filtrate from the bomb.

Example 4

A carbonylation reaction is run according to the procedures of Example 1, substituting 9.5 g. of 3-bromopropyne for the allyl bromide. The reaction is run for 1 hour at 100° C., and methyl 4-butynoate is isolated from the filtrate by distillation.

Example 5

A carbonylation reaction is run according to the procedures of Example 1, substituting 6.1 g. of allyl chloride for the allyl bromide. The reaction is run for 0.5 hour at 340° C., and the same esters are isolated by distillation.

Example 6

A carbonylation reaction is run according to the procedures of Example 1, substituting 5.5 g. of sodium ethoxide for the sodium methoxide. The analogous ethyl esters are isolated after completion of the reaction.

Example 7

A carbonylation reaction is run according to the procedures of Example 1, substituting 15.7 g. of 1-phenyl-3-bromopropene for the allyl bromide. The methyl 4-phenyl-3-butenoate is isolated by distillation.

Example 8

A carbonylation reaction is run according to the procedures of Example 1, substituting 12.9 g. of 3-bromocyclohexene for the allyl bromide. The methyl 2-cyclohexenecarboxylate and methyl 1-cyclohexenecarboxylate are isolated from the filtrate by distillation.

Example 9

A 400 cc. stainless steel bomb is charged with 15.6 g. of $\alpha,3,4$ - trichlorotoluene, 4.4 g. of sodium methoxide, 5 g. of 5% palladium on carbon and 50 ml. of xylene. After the bomb is purged with nitrogen, 5.3 g. of carbon dioxide is added and the bomb is pressurized to 165 p.s.i.g. with carbon monoxide. The bomb is sealed and placed in a rack where it can be both heated and shaken. The agitating mixture is heated for 1 hour at 225° C. under autogenous pressure. The bomb is cooled, and the slurry is boiled in 300 ml. of xylene. The boiling slurry is filtered, and methyl 3,4-dichlorophenylacetate is isolated from the filtrate.

Example 10

11.4 grams of methyl iodide, 4.4 g. sodium methylate, 5.0 g. of 5% palladium on carbon, and 50 ml. xylene are added to a 400 cc. bomb. The bomb is closed, and 5.3 g. carbon dioxide is added. The bomb is then charged with 165 p.s.i.g. of carbon monoxide at 25° C. The bomb and contents are heated for 2 hours at 250° C. The maximum pressure developed is 510 p.s.i.g. The bomb is cooled and vented and the resulting slurry is filtered to remove the catalyst. The filtrate is distilled, and methyl acetate is isolated in the fraction boiling at 45–55° C.

Example 11

16.8 grams of cyclohexyl iodide are substituted for the methyl iodide of Example 10 and are reacted in a similar fashion. Cyclohexanecarboxylic acid, methyl ester, is isolated from the filtrate by distillation in the fraction boiling at 180–186° C.

Example 12

A 400 cc. stainless steel bomb was charged with 10.2 g. of $\alpha$-chlorotoluene, 4.4 g. of sodium methoxide, 5 g. of 5% palladium on carbon and 50 ml. of xylene. After the bomb was purged with nitrogen, 5.3 g. of carbon dioxide was added, and the bomb was pressurized to 162 p.s.i.g. with carbon monoxide. The bomb was sealed, and placed in a rack where it was both heated and shaken. The agitating mixture was heated at 200° C. for 1 hour under autogenous pressure (410–490 p.s.i.g.). The bomb was cooled, and the slurry filtered. The filtrate was distilled at atmospheric pressure through a 40 cm. spinning band column. Methyl phenylacetate was distilled from the mixture at 70–73° C. at 2.8 mm. Hg ($n_D^{25}$ 1.5044).

Example 13

In a carbonylation reaction smiliar to that described in Example 12, 13.7 g. of $\alpha$-bromotoluene is used in place of the $\alpha$-chlorotoluene of that example. The reaction is run for 1 hour at 150° C., and methyl phenylacetate is isolated according to the procedure of Example 12.

What is claimed is:

1. A process for the preparation of organic esters by reacting at a temperature of from 100° C. to 400° C. and a pressure of from 100 to 5,000 p.s.i. (1) carbon monoxide, (2) an organic halide selected from aralkyl halides, aralkenyl halides, alkyl halides, allylic halides, alkynyl halides, cycloalkenyl halides or cycloalkyl halides where said halide is iodine, bromine or chlorine and (3) an alcoholate of 1 to 6 carbon atoms selected from the alkali alcoholates or alkaline earth alcoholates, said reaction takes place in the presence of (a) at least one equivalent of carbon dioxide per equivalent of alcoholate and (b) a palladium catalyst with the proviso that when said organic halide is a *normal* alkyl halide said halide is iodine.

2. The process of claim 1 where carbon monoxide is present in an amount to provide at least one equivalent of carbon monoxide per equivalent of organic halide.

3. The process of claim 1 where said catalyst is present in an amount of between 0.01 to 50 mole percent of palladium based on the organic halide.

4. The process of claim 3 where the reaction ingredients are dispersed in a solvent which is substantially free of active hydrogen atoms.

5. The process of claim 3 where said pressure is 200 to 1,000 p.s.i.

6. The process of claim 1 wherein said organic halide is α-bromotoluene.

7. The process of claim 1 wherein said organic halide is allyl bromide.

8. The process of claim 1 wherein said organic halide is 3-bromopropyne.

References Cited

UNITED STATES PATENTS

| | | | |
|---|---|---|---|
| 3,309,403 | 3/1967 | Mador et al. | 260—544 |
| 3,338,961 | 8/1967 | Closson et al. | 260—544 |
| 3,632,831 | 1/1972 | Knowles | 260—475 R |
| 3,457,299 | 7/1969 | Closson et al. | 260—486 AC |
| 3,454,632 | 7/1969 | Mador et al. | 260—544 A |

FOREIGN PATENTS

| | | | |
|---|---|---|---|
| 1,080,867 | 8/1967 | Great Britain | 260—486 AC |
| 713,297 | 10/1968 | Belgium | 260—493 |
| 3,912,916 | 7/1964 | Japan | 260—486 AC |

OTHER REFERENCES

Tsutsumi et al.: From Summaries of Lectures Presented in the 16th Annual Meeting of the Chemical Society of Japan, pp. 458–59, Mar. 31, 1963.

LORRAINE A. WEINBERGER, Primary Examiner

P. J. HAGAN, Assistant Examiner

U.S. Cl. X.R.

260—486 AC, 493, 468 M